United States Patent [19]

De Marsh

[11] Patent Number: 4,538,215

[45] Date of Patent: * Aug. 27, 1985

[54] HALIDE AND LIKE LIGHT REFLECTOR AND SOCKET ASSEMBLY

[76] Inventor: Melvin J. De Marsh, 4306 SW. Juneau St., #11, Seattle, Wash. 98136

[ * ] Notice: The portion of the term of this patent subsequent to Dec. 29, 2000 has been disclaimed.

[21] Appl. No.: 552,698

[22] Filed: Nov. 17, 1983

Related U.S. Application Data

[62] Division of Ser. No. 299,673, Sep. 8, 1981, Pat. No. 4,418,379.

[51] Int. Cl.³ ............................................... F21V 7/00
[52] U.S. Cl. ...................................... 362/282; 362/18; 362/285; 362/296; 362/323; 362/341; 362/401
[58] Field of Search ................. 362/18, 282, 285, 296, 362/323, 341, 401

[56] References Cited

U.S. PATENT DOCUMENTS 2,780,720  2/1957  Bertrams .
3,154,253 10/1964  Guth .
3,839,632 10/1974  Federico .
4,338,655  7/1982  Gulliksen .
4,418,379 11/1983  De Marsh ........................... 362/401

FOREIGN PATENT DOCUMENTS 666602 1/1929 France .

Primary Examiner—Donald P. Walsh
Attorney, Agent, or Firm—Graybeal & Cullom

[57] ABSTRACT

A lighting assembly especially adapted for promoting growth of plants in a greenhouse environment and the like, having a reflector cone with a light reflecting surface at a single cone angle of from about 76° to about 64° and preferably at an angle of about 68° with respect to the center axis of the cone, and having a high powered halide or like light in part extending substantially below the plane of the outer edge of the reflector cone when the assembly is supported in a depending manner.

7 Claims, 3 Drawing Figures

HALIDE AND LIKE LIGHT REFLECTOR AND SOCKET ASSEMBLY

CROSS-REFERENCE TO RELATED APPLICATION

This application is a divisional application of my application Ser. No. 299,673, entitled Halide And Like Light Reflector And Socket Assembly For Greenhouse And Like Use, filed Sept. 8, 1981, and which is now U.S. Pat. No. 4,418,379, issued Nov. 29, 1983.

BACKGROUND OF THE INVENTION (1) Field of the Invention

The present invention relates generally to the art of lighting fixtures, and more particularly to reflector and socket assemblies for high powered lamps such as halide lights or the like wherein the reflector and its associated components are especially adapted to enhance use of the light for effectively illuminating and promoting the growth of plants in a greenhouse or the like.

(2) Background Art

High powered halide lights and the like are well-known and widely used for overhead street and roadway lighting because of the high intensity of illumination they provide, and in such usage are conventionally used in light fixtures comprising either a globular transluscent surrounding envelope or a reflector in fixed form. Several varieties of fixed form reflectors for this type of lighting are commercially available and typically involve relatively heavy and rigid, pressed steel reflectors such as the Abolite reflector manufactured and marketed by Abolite Lighting Inc., West Lafayette, Ohio, the configuration of such reflectors being that of a generally cylindrical sleeve portion spaced from and surrounding, with ventilating holes, a screw type socket, below which there is a flared out, generally hemispherical portion, below which is a further downwardly and outwardly extending portion terminating in an almost cylindrical downwardly directed lip. Such a reflector, which is conventionally arranged on posts or the like for street or roadway lighting, tends to reflect the light downwardly in a relatively narrow flood angle, e.g. 20° or 30°, which is generally satisfactory for street lighting or the like because the reflectors are typically located 30 or 40 feet or more above the street or highway surface being illuminated.

A further usage for high powered halide and like type lights has evolved more or less recently, and that is for the illumination of growing plants in enclosed building spaces, such as in greenhouses or the like, where it has been found that such type of lighting is quite satisfactory for enhancing the growth rate of plants and other flora. However, in the greenhouse or like environment the most effective usage of such lighting is with the lights only a few feet, e.g. 4 to 6 feet, above the growing plants, and it has been found that, in such environment and arrangement, commercially available reflectors for halide and like lights are not suitable, or at least not nearly as effective as they should be, because the resulting flood beam is so narrow that the lighting throughout the greenhouse or the like is quite uneven and either too intense or insufficient on a localized basis. Moreover, commercially available reflectors for halide and like lights have been found to be unduly heavy and unduly expensive to fabricate for greenhouse or like lighting purposes in that they are principally designed for rough, outdoor usage whereas the greenhouse or like environment does not require comparable rugged construction.

SUMMARY OF THE INVENTION

It is an object and feature of the present invention to provide a reflector and socket assembly for high powered halide and like lights which is especially adapted for use in greenhouse or like applications of such lights, wherein such lights are situated over and relatively close to growing plants and wherein it is desired that the light be relatively uniformly distributed over a relatively wide area.

It is a further object and feature of the invention to provide a reflector and socket assembly for halide and like lights for greenhouse and like illumination purposes wherein the reflector can be economically and readily fabricated from nominally planar sheet stock.

These and other features, advantages and characteristics of the present invention will occur to those skilled in the art to which the invention is addressed, in the light of the following description and accompanying illustration of typical specific forms thereof.

DESCRIPTION OF THE PREFERRED EMBODIMENTS

Figure 1:
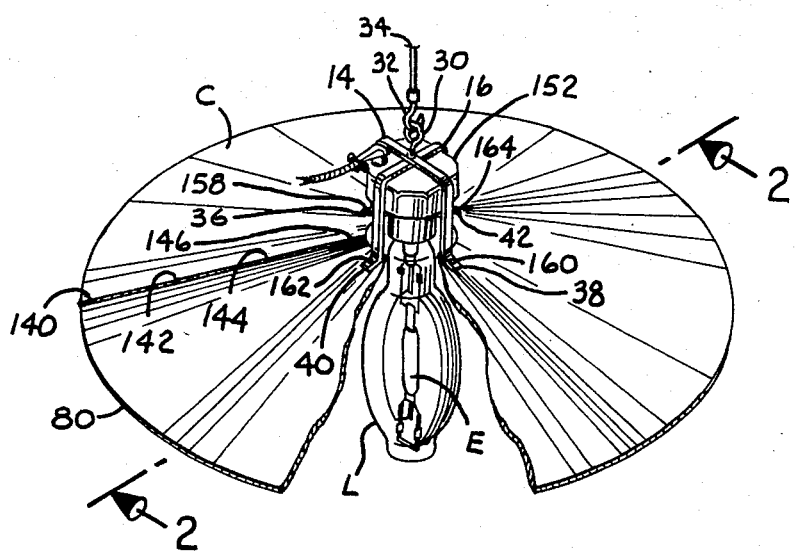
FIG. 1 is a perspective view from an upper aspect of the reflector and socket assembly according to the present invention.
Figure 2:
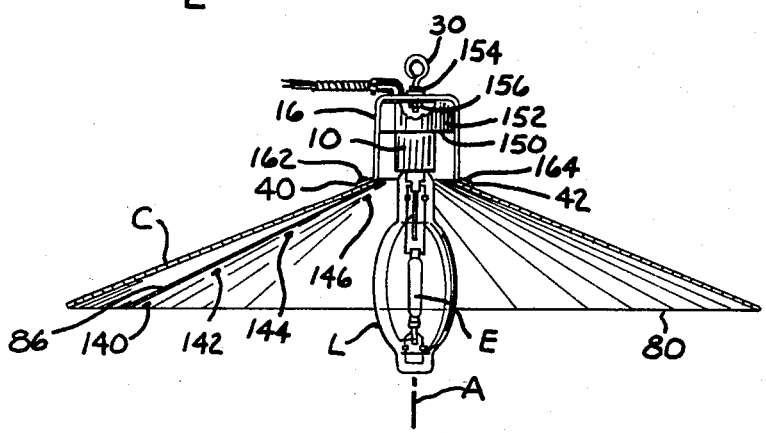
FIG. 2 is a view in vertical cross section of the reflector and socket assembly shown in FIG. 1, taken substantially along line 2—2 thereof.
Figure 3:
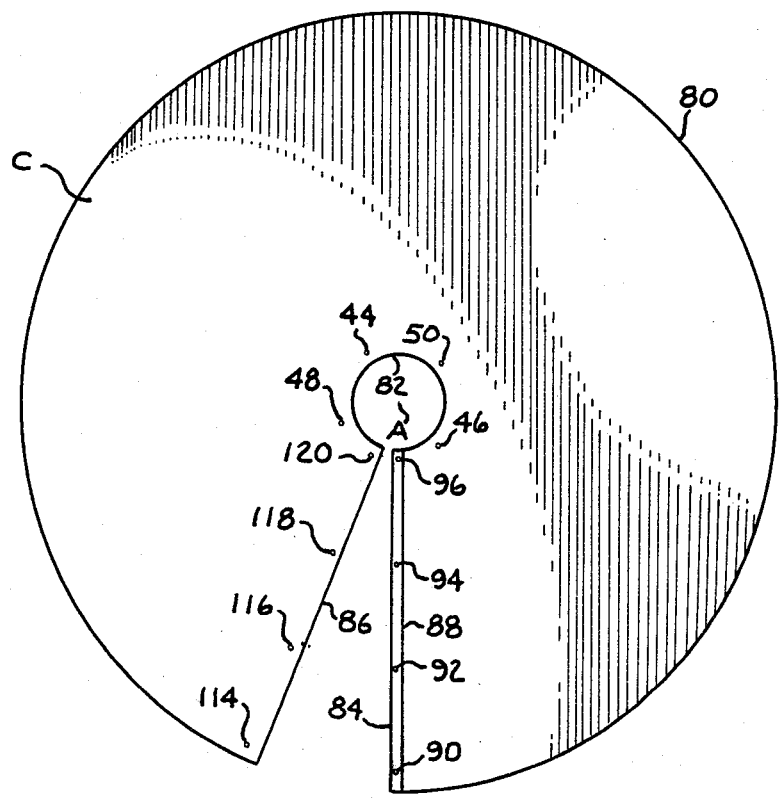
FIG. 3 is a plan view, showing the pattern of the reflector portion of the assembly shown in FIGS. 1 and 2, as cut from nominally planar sheet stock and before interconnection of the radial edges thereof to form the frustoconical reflector.

FIGS. 1, 2 and 3 show a halide and like type light reflector and socket assembly according to the present invention, which is made rigid, i.e. nonadjustable, as to cone angle.

In this assembly, reflector cone C is cut from nominally planar sheet stock, with outer and inner circular edges 80, 82, and segmented along radial cuts to provide radially extending edges 84, 86. The radially extending edges 84, 86 are cut along radii to provide in the cone C when assembled a cone angle of substantially 68° relative to the central axis A, and with single rows of assembly holes 90, 92, 94, 96, and 114, 116, 118, 120 adjacent respective radially extending edges 84, 86. Assembly holes 44, 46, 48, 50 are drilled or otherwise formed adjacent the central opening edge 82.

Cone reflector C, during fabrication and in blank form as shown at FIG. 3, is advantageously fabricated from nominally planar sheet stock such as 0.045" gauge aluminum sheet, four feet in diameter, and surfaced on at least one (i.e. the lower) side, with a light colored, highly reflective surface, such as a white baked enamel coating. To fabricate the reflector, the sheet stock is cut, by means conventional per se, to desired outer diameter (e.g. forty-eight inches) and to a desired central aperture diameter (e.g. four inches) to form respective outer and inner edges 80, 82. Radial cuts are also made to provide radially extending edges 84, 86 which are brought together and overlapped to an extent to change the form of the material from essentially planar to frustoconical. A stiffening strip 88 of aluminum or like material is laid along radial edge 84 and riveted or otherwise attached thereto in a manner conventional per se, and a plurality of holes 90, 92, 94, 96 are drilled or otherwise formed through the strip 88 and cone adjacent the edge 84.

Cone reflector C is formed to the desired cone angle simply by drawing the radially extended edges thereof together with sufficient overlap to align the respective edge holes 90–96 and 114–120, with pop rivets being applied to assemble the edges together, as indicated at respective ribets 140, 142, 144, 146.

The socket assembly of the form of the invention shown in FIGS. 1 and 2 is suitably a fixed assembly comprising conventional lamp socket 10 mounted centrally of conventional cover 150 of conventional electrical outlet box 152, with quadrantly arranged U-shaped straps 14, 16 bolted together centrally and to the bottom of the outlet box 152 by means of eye-bolt 30 and associated upper and lower nuts 154, 156. Centrally of and interconnecting the U-shaped mounting straps 14, 16 is an eye bolt 30 configured and arranged so that the socket and reflector assembly can be hung or otherwise supportably mounted in a depending manner from the overhead structure, as by a suspension hook 32 and cable 34 (FIG. 1). Apertured, lower, outwardly bent respective ends 36, 38 and 40, 42 of the mounting straps 14, 16 are connected to the reflector cone C by means of respective rivets 158, 160 and 162, 164 to assemble the socket 10 of outlet box 152 and the mounting straps 14, 16 concentrically with the reflector cone C, the arrangement being such that halide or like type lamp L and its light emitting element E, with the lamp L screwed into socket 10, is concentric with the central axis A of the assembly and with the light emitting element E substantially in the plane of the lower edge 80 of the reflector cone C.

The cone reflector C is shown in FIGS. 1 and 2 in its assembled form with a selected cone angle of 68° and with the light emitting element E of the halide lamp L being substantially in the plane of the lower outer edge 80 of the reflector cone C, which is considered to be the preferred orientation of the light and cone reflector in applications of this assembly where the light emitting element E is arranged about 4–6 feet above the tops of growing plants. As will be apparent, however, considerable variation in both cone reflector angle and the relative vertical position of the light L and its light emitting element E are available to the user in any given use environment, as well as variation, of course, in the suspension level in general, by means of variation in the length of suspension cable 34 or the like. As will be apparent, the specific dimension involved as to the outer and inner edges of the reflector cone may be varied to an appreciable extent, it being considered in this regard, however, that the outer diameter of the cone should be at least about 4 feet for optimally effective reflection downwardly of the emitted light, and that the diameter of the central opening provided by inner edge 82 should be a least about 4 inches since the outer diameter of the socket 10 in the examples selected is about 2¼ inches and since adequate spacing should be provided around the socket for substantial air circulation upwardly from the hot surface of the lamp L.

From the foregoing, various further modifications and adaptations of the constructural arrangement and form of the assemblies shown and discussed will be apparent to those skilled in the art to which the invention is addressed. Thus, by way of further and nonlimitative example, other lightweight materials can be used in the fabrication of the reflector cone and the reflecting surface of the cone can be arranged at an angle in the range of from about 76°–64° with respect to the cutter axis of the cone.

I claim:

1. A reflector and socket assembly for a high powered halide light or the like, especially adapted to enhance use thereof for effectively illuminating and promoting the growth of plants in a greenhouse or the like, said assembly comprising:

a frustoconically shaped reflector in the form of a simple sheet metal cone, with the lower concavical, reflecting surface thereof arranged at a selected angle of from about 76° to about 64° with respect to the center axis of the cone; and a lamp socket mounted coaxially of and slightly above and in spaced relationship with respect to the central opening of the cone, with the light emitting element of a halide lamp or the like installed in the socket being substantially in the plane of the lower, outer edge of the reflector cone.

2. An assembly according to claim 1, wherein the cone reflector has an outer diameter of about forty-eight inches and a central opening diameter of about four inches.

3. An assembly according to claim 1, wherein said cone is fabricated of nominally planar sheet stock, with a small segment cut therefrom along cuts extending generally radially of the cone, the radially extending edges being joined to provide the conical configuration of the reflector as assembled.

4. An assembly according to claim 1, wherein said reflector is fabricated with the cone in fixed form, with the radially cut edges thereof riveted together.

5. The assembly according to claim 1, comprising socket mounting means including generally U-shaped straps to which said lamp socket is connected centrally, and means interconnecting the ends of said straps and the cone adjacent the edge of the central opening therein.

6. An assembly according to claim 1, wherein the cone angle is about 68°.

7. A lighting assembly especially adapted to enhance use thereof for effectively illuminating growing plants in a greenhouse or the like, said assembly comprising:

a conically shaped reflector in the form of a simple frustocone with the lower, concavical, reflecting surface thereof arranged at a uniform cone angle of about 76°–64° with respect to the center axis of the cone, said cone having a central opening about four inches in diameter, said cone being fabricated of nominally planar sheet metal stock, with a small segment cut therefrom along cuts extending generally radially of the cone, the radial cuts being joined generally adjacent the edges thereof to provide the conical configuration of the reflector;

a lamp socket mounted coaxially of and slightly above the central opening of the cone, and in open, spaced relation thereto for air circulation therebetween;

means attached to said socket by which the assembly can be hung or otherwise supported in a depending manner from overhead structure; and a high powered halide light mounted in said socket in part extending substantially below the plane of the outer edge of the conically shaped reflector.

* * * * *